(12) United States Patent
Agari et al.

(10) Patent No.: US 7,489,478 B2
(45) Date of Patent: Feb. 10, 2009

(54) MAGNETIC DISK DRIVE HEAD SUSPENSION HAVING A LIFT TAB WHICH ENGAGES A LIMITER

(75) Inventors: Hiroshi Agari, Kanagawa-ken (JP);
Marutomo Gotou, Kanagawa-ken (JP);
Shinobu Hagiya, Kanagawa-ken (JP);
Naoki Maeda, Kanagawa-ken (JP);
Shigeo Nakamura, Kanagawa-ken (JP);
Haruhide Takahashi, Kanagawa-ken (JP); Kousaku Wakatsuki, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 443 days.

(21) Appl. No.: 11/200,562

(22) Filed: Aug. 9, 2005

(65) Prior Publication Data

US 2006/0034017 A1   Feb. 16, 2006

(30) Foreign Application Priority Data

Aug. 10, 2004   (JP) .............................. 2004-233239

(51) Int. Cl.
*G11B 5/54* (2006.01)
(52) U.S. Cl. .................................... 360/245.7; 360/255
(58) Field of Classification Search .............. 360/245.7, 360/255, 254.6
See application file for complete search history.

(56) References Cited

U.S. PATENT DOCUMENTS

| | | | |
|---|---|---|---|
| 5,838,517 A | | 11/1998 | Frater et al. |
| 5,930,079 A | * | 7/1999 | Vera et al. ................. 360/245.7 |
| 6,233,121 B1 | * | 5/2001 | Pan ........................... 360/245.7 |
| 6,587,311 B1 | * | 7/2003 | Niijima et al. .............. 360/255 |
| 2002/0075602 A1 | * | 6/2002 | Mangold et al. ......... 360/245.7 |
| 2003/0137774 A1 | * | 7/2003 | Fu et al. ................... 360/245.7 |
| 2004/0027725 A1 | * | 2/2004 | Pan et al. .................. 360/245.3 |
| 2005/0036239 A1 | * | 2/2005 | Weber ....................... 360/245.5 |
| 2005/0047021 A1 | * | 3/2005 | Kim et al. ................. 360/245.7 |

(Continued)

FOREIGN PATENT DOCUMENTS

JP         11-500852         1/1999

(Continued)

*Primary Examiner*—Jefferson Evans
(74) *Attorney, Agent, or Firm*—Townsend and Townsend Crew LLP; Patrick Duncan

(57) ABSTRACT

Embodiments of the invention limit a pitch attitude angle of a magnetic head slider during loading without allowing gimbal stiffness of a flexure in an ordinary flying state to be increased. In one embodiment, a limiter formed by part of a flexure is disposed so as to provide a clearance from a lift tab formed by part of a load beam. A limiter clearance, if the clearance between the limiter and the lift tab is so called for convenience sake, must be maintained as a physical clearance when a magnetic head slider is in an ordinary flying state. The lift tab and the limiter are disposed on a side of an air inflow end of the magnetic head slider. The limiter clearance during unloading is thereby made small so as to allow proper and positive unloading operation. In addition, the limiter clearance made small during loading allows the absolute value of a pitch attitude angle of the magnetic head slider to be limited to a small one if the pitch attitude angle tends to become negative due to disturbances or vibration from the loading operation itself.

18 Claims, 9 Drawing Sheets

U.S. PATENT DOCUMENTS

| | | | |
|---|---|---|---|
| 2005/0157428 A1* | 7/2005 | Choi | 360/245.7 |
| 2005/0174696 A1* | 8/2005 | Choi et al. | 360/245.7 |
| 2006/0044694 A1* | 3/2006 | Girard | 360/245.7 |
| 2006/0262456 A1* | 11/2006 | Wang et al. | 360/245.3 |
| 2007/0159726 A1* | 7/2007 | Maslov et al. | 360/245.1 |
| 2007/0263323 A1* | 11/2007 | Uematsu et al. | 360/234.6 |
| 2007/0268629 A1* | 11/2007 | Coffey et al. | 360/245.7 |

FOREIGN PATENT DOCUMENTS

| | | |
|---|---|---|
| JP | 2000-076812 | 3/2000 |

* cited by examiner

MAGNETIC DISK DRIVE HEAD SUSPENSION HAVING A LIFT TAB WHICH ENGAGES A LIMITER

CROSS-REFERENCES TO RELATED APPLICATIONS

This application claims priority from Japanese Patent Application No. JP2004-233239, filed Aug. 10, 2004, the entire disclosure of which is incorporated herein by reference.

BACKGROUND OF THE INVENTION

The present invention relates in general to a magnetic head suspension, a magnetic head assembly, and a magnetic disk drive, and more particularly to a mechanism for loading and unloading a magnetic head slider.

When a magnetic disk drive using a load/unload (L/UL) mechanism for a magnetic head slider is operated, the magnetic head slider flies over a magnetic disk to allow information to be written and read. A suspension provides a predetermined thrust load on the magnetic head slider in a direction toward a magnetic disk surface. This thrust load balances a pressure of an air flow produced between the magnetic head slider and the magnetic disk surface. A clearance between the magnetic head slider and the magnetic disk, or a flying height of the magnetic head slider is thereby maintained at a predetermined value. When no write or read operation occurs, the magnetic head slider is unloaded out of the disk. During a write or read operation, on the other hand, the magnetic head slider is again loaded onto the disk.

FIG. 9 shows a conventional magnetic head assembly. The L/UL suspension in many of the conventional magnetic head assemblies uses a mechanism (limiter) 5 for limiting a position of the magnetic head slider. The limiter 5 functions to limit the position of a magnetic head slider 4 even with an input of impact applied thereto during an inoperative state, thereby preventing the magnetic head slider 4 and a flexure 3 from being damaged. The limiter 5 also helps the magnetic head slider 4 take off from the disk surface by counteracting a negative pressure the magnetic head slider 4 produces as the slider 4 is to be unloaded.

If the flexure 3, to which the magnetic head slider 4 is attached, is about to leave a load beam 2 a given distance or more, the limiter 5 is engaged with the load beam 2, thereby limiting the motion of the flexure 3. The limiter 5 also functions to assure a degree of freedom, with which the magnetic head slider 4 comfortably follows the disk in an ordinary flying state. Specifically, there is provided an ample clearance to ensure that the limiter 5 will not be in contact with the load beam 2, thus disrupting the flying state, even with a varying setting height or inclination between an actuator arm 6 and the disk, or part-to-part variations, and the like.

An L/UL lift tab 1 is provided at a leading end of the load beam 2. The limiter 5 is provided on the side of an air inflow end of the magnetic head slider 4. The lift tab 1 rides on a ramp mechanism, which causes the magnetic head slider 4 to be unloaded from the magnetic disk surface. Should the lift tab 1 undergo elastic deformation as a result of its riding on the ramp mechanism, the limiter clearance does not become small. It is therefore not possible to limit fluctuations in the position of the magnetic head slider 4 in a pitch direction.

Patent Document 1 (Japanese Patent Laid-open No. 2000-76812) discloses an invention that provides a slider position control mechanism for providing a connection between the air inflow end of the slider and the load beam in order to control an angle of contact of the slider with the disk. Patent Document 2 (Japanese Translations of PCT for Patent No. Hei 11-500852) discloses an invention, in which the load beam is provided with a mechanism for limiting a pitching motion of the slider in order to limit pitching of the slider occurring from impact applied when a head stack assembly is assembled into position.

BRIEF SUMMARY OF THE INVENTION

When the magnetic head slider is to be loaded on the disk, vibration can occur due to disturbance or from the loading operation itself. Should such vibration occur, a pitch attitude angle of the magnetic head slider could at times be in a minus direction (in a direction in which the air inflow end of an air bearing surface approaches more the disk surface than an air outflow end). If the magnetic head slider loads from the air inflow end, there is a stronger probability that the disk surface would be damaged. With a disk smoothed for a lower flying height in particular, a greater friction force upon contact is involved. Thus, loading of the magnetic head slider from the air inflow end makes stronger the probability of damage. There is therefore a significant challenge in assuring reliability in loading.

There is also another problem of degraded reliability that may be encountered when the magnetic head slider producing a large negative pressure is unloaded. Specifically, if the limiter clearance is too wide, a small lift amount does not ensure that the magnetic head slider is unloaded at a desired position. As a result, the magnetic head slider advances up to the outermost periphery of the disk in a flying state.

The mechanism disclosed in Patent Document 1 uses a member for connecting the air inflow end of the slider with the load beam. This results in a gimbal stiffness of the flexure being increased. Further, the technique disclosed in Patent Document 2 is intended for use during assembly. The technique is not aimed for loading/unloading during operation of the magnetic disk drive. It is difficult to limit the pitch attitude angle of the magnetic head slider during loading without allowing the gimbal stiffness of the flexure in an ordinary flying state to be increased.

It is therefore a feature of the present invention to provide a suspension capable of limiting fluctuations in a position of the magnetic head slider in the pitch direction.

It is another feature of the present invention to provide a magnetic head assembly capable of limiting fluctuations in the position of the magnetic head slider in the pitch direction.

It is still another feature of the present invention to provide a magnetic disk drive capable of enhancing reliability in loading and unloading of the magnetic head slider.

A suspension according to an aspect of the present invention comprises a load beam having a lift tab; and a flexure having one end attached to the load beam, a limiter engaged with the lift tab, and the other end including a portion for mounting a magnetic head slider.

A suspension according to another aspect of the present invention comprises a load beam having a lift tab extending in a direction of an end portion attached to a base plate; and a flexure having one end attached to the load beam, a limiter engaged with the lift tab, and the other end including a portion for mounting a magnetic head slider.

A suspension according to another aspect of the present invention comprises a load beam having a lift tab extending in a direction opposite to an end portion attached to a base plate; and a flexure having one end attached to the load beam and the other end including a portion for mounting a magnetic head slider and a limiter engaged with the lift tab.

The lift tab and the limiter are provided so as to be positioned on the side of an air inflow end of the magnetic head slider when the magnetic head slider is mounted to the portion of the flexure for mounting a magnetic head slider.

A suspension according to another aspect of the present invention comprises a load beam having one end, to which a hinge is attached, and the other end including a lift tab; and a flexure having one end attached to the load beam, a limiter engaged with the lift tab, and the other end including a portion for mounting a magnetic head slider.

A suspension according to another aspect of the present invention comprises a load beam having one end, to which a hinge is attached, and the other end including a lift tab extending in a direction of the hinge; and a flexure having one end attached to the load beam, a limiter engaged with the lift tab, and the other end including a portion for mounting a magnetic head slider.

A suspension according to another aspect of the present invention comprises a load beam having one end, to which a hinge is attached, and the other end including a lift tab extending in a direction opposite to the hinge; and a flexure having one end attached to the load beam and the other end including a portion for mounting a magnetic head slider and a limiter engaged with the lift tab.

The lift tab and the limiter are provided so as to be positioned on the side of an air inflow end of the magnetic head slider when the magnetic head slider is mounted to the portion of the flexure for mounting a magnetic head slider.

A magnetic head assembly according to another aspect of the present invention comprises a base plate; a load beam having one end attached to the base plate and the other end including a lift tab; a flexure having one end attached to the load beam, a limiter engaged with the lift tab, and the other end including a portion for mounting a magnetic head slider; and a magnetic head slider mounted to the portion of the flexure for mounting a magnetic head slider.

A magnetic head assembly according to another aspect of the present invention comprises a base plate; a load beam having one end attached to the base plate and the other end including a lift tab extending in a direction of the base plate; a flexure having one end attached to the load beam, a limiter engaged with the lift tab, and the other end including a portion for mounting a magnetic head slider; and a magnetic head slider mounted to the portion of the flexure for mounting a magnetic head slider.

A magnetic head assembly according to another aspect of the present invention comprises a base plate; a load beam having one end attached to the base plate and the other end including a lift tab extending in a direction opposite to the base plate; a flexure having one end attached to the load beam and the other end including a portion for mounting a magnetic head slider and a limiter engaged with the lift tab; and a magnetic head slider mounted to the portion of the flexure for mounting a magnetic head slider.

The lift tab and the limiter are located on the side of an air inflow end of the magnetic head slider.

A magnetic head assembly according to another aspect of the present invention comprises a base plate; a load beam having one end attached to the base plate by way of a hinge and the other end including a lift tab; a flexure having one end attached to the load beam, a limiter engaged with the lift tab, and the other end including a portion for mounting a magnetic head slider; and a magnetic head slider mounted to the portion of the flexure for mounting a magnetic head slider.

A magnetic head assembly according to another aspect of the present invention comprises a base plate; a load beam having one end attached to the base plate by way of a hinge and the other end including a lift tab extending in a direction of the base plate; a flexure having one end attached to the load beam, a limiter engaged with the lift tab, and the other end including a portion for mounting a magnetic head slider; and a magnetic head slider mounted to the portion of the flexure for mounting a magnetic head slider.

A magnetic head assembly according to another aspect of the present invention comprises a base plate; a load beam having one end attached to the base plate by way of a hinge and the other end including a lift tab extending in a direction opposite to the base plate; a flexure having one end attached to the load beam and the other end including a portion for mounting a magnetic head slider and a limiter engaged with the lift tab; and a magnetic head slider mounted to the portion of the flexure for mounting a magnetic head slider.

The lift tab and the limiter are located on the side of an air inflow end of the magnetic head slider.

A magnetic disk drive according to another aspect of the present invention comprises a magnetic disk; a magnetic head slider for reading data from and writing data onto the magnetic disk; and a suspension for holding the magnetic head slider. The suspension includes a load beam including a lift tab; and a flexure having one end attached to the load beam, a limiter engaged with the lift tab, and the other end including a portion for mounting the magnetic head slider.

The lift tab and the limiter are located on the side of an air inflow end of the magnetic head slider.

A magnetic disk drive according to another aspect of the present invention comprises a magnetic disk; a magnetic head slider for reading data from and writing data onto the magnetic disk; and a suspension for holding the magnetic head slider. The suspension includes a load beam having one end attached to a hinge and the other end including a lift tab; and a flexure having one end attached to the load beam, a limiter engaged with the lift tab, and the other end including a portion for mounting the magnetic head slider.

The lift tab and the limiter are located on the side of an air inflow end of the magnetic head slider.

According to the present invention, it is possible to limit fluctuations in the pitch attitude angle of the magnetic head slider.

DETAILED DESCRIPTION OF THE INVENTION

Figure 8:
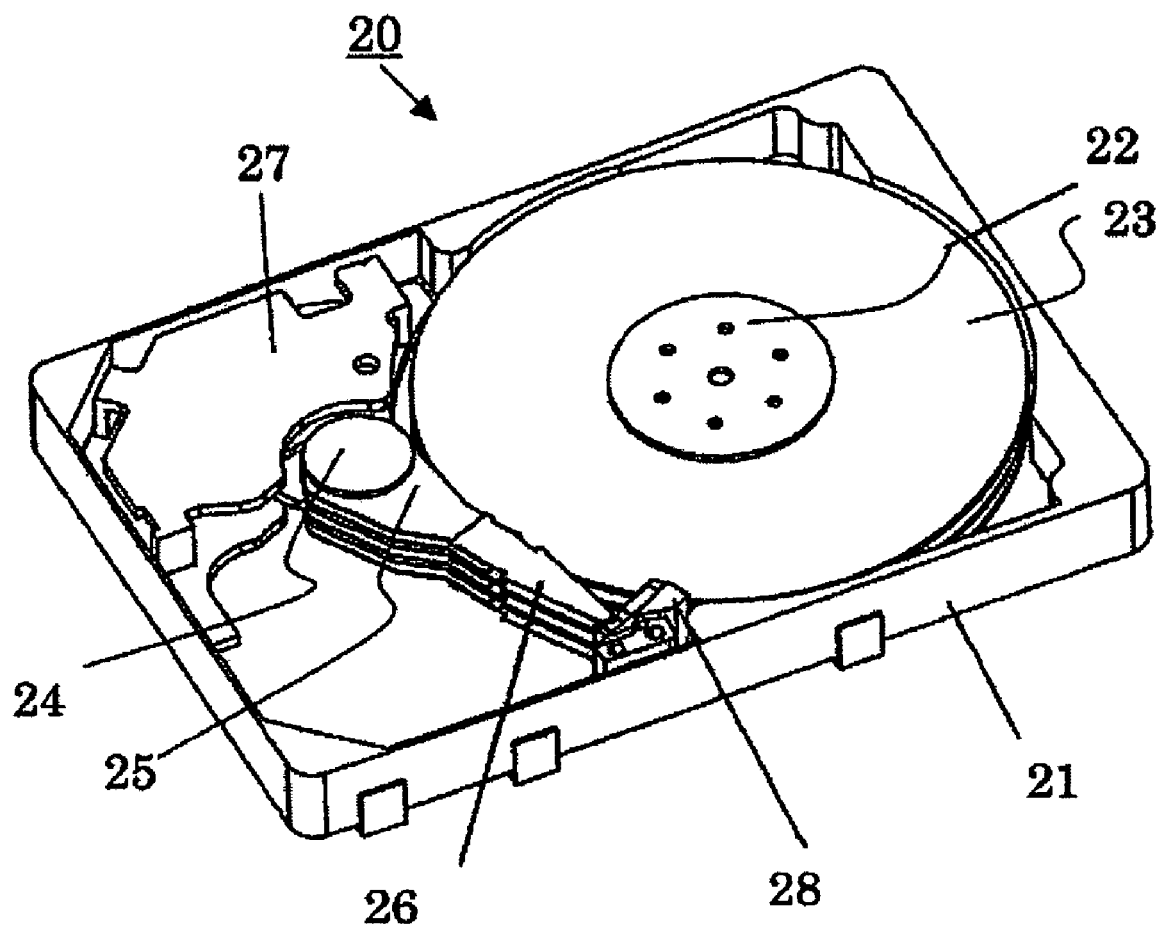
FIG. 8 is a perspective view showing a magnetic disk drive according to an embodiment of the present invention.
Figure 9:
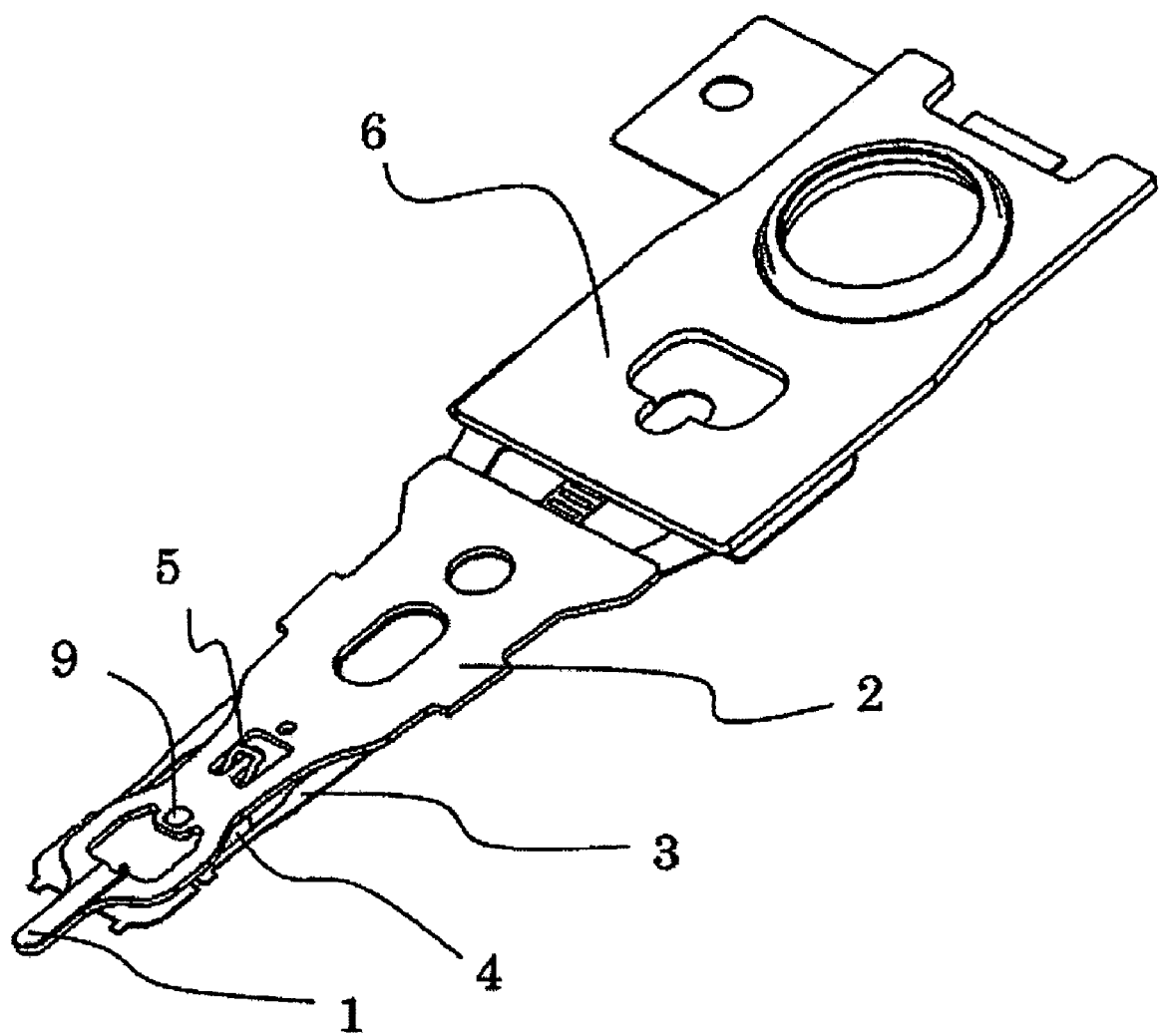
FIG. 9 is a perspective view showing a conventional magnetic head assembly.

FIG. 8 shows the construction of a magnetic disk drive 20 mounted with the magnetic head assembly according to an embodiment of the present invention. A magnetic disk 23 is mounted on a rotary shaft 22 of a spindle motor secured to a base 21. The magnetic disk 23 is thus rotatably driven. A pivot 24 rotatably supports an actuator arm 25. A magnetic head assembly 26 is mounted on one end of the actuator arm 25. A coil (not shown) forming part of a voice coil motor 27 is mounted on the other end of the actuator arm 25. A magnetic head slider (not shown) is attached to a leading end of a suspension forming part of the magnetic head assembly 26. A ramp mechanism 28 is provided on the base 21 and located on an outer peripheral side of the magnetic disk 23. A slope, on which a lift tab (not shown) rides when the magnetic head slider is unloaded, is formed in the ramp mechanism 28.

When current is passed through the coil of the voice coil motor 27, rotational torque is generated in the actuator arm 25. The magnetic head assembly 26 mounted on the actuator arm 25 is then moved in a radial direction of the magnetic disk 23. This rotary action moves the magnetic head slider attached to the leading end of the suspension forming part of the magnetic head assembly 26 to any given radial position in the magnetic disk 23. Data is thereby written to or read from the magnetic disk 23. When the magnetic head slider is to be unloaded, the lift tab is moved so as to ride on a slope in the ramp mechanism 28. During a loading sequence, the magnetic head slider is loaded onto a recording surface of the magnetic disk 23, as driven from a standby state in the ramp mechanism 28.

Figure 1:
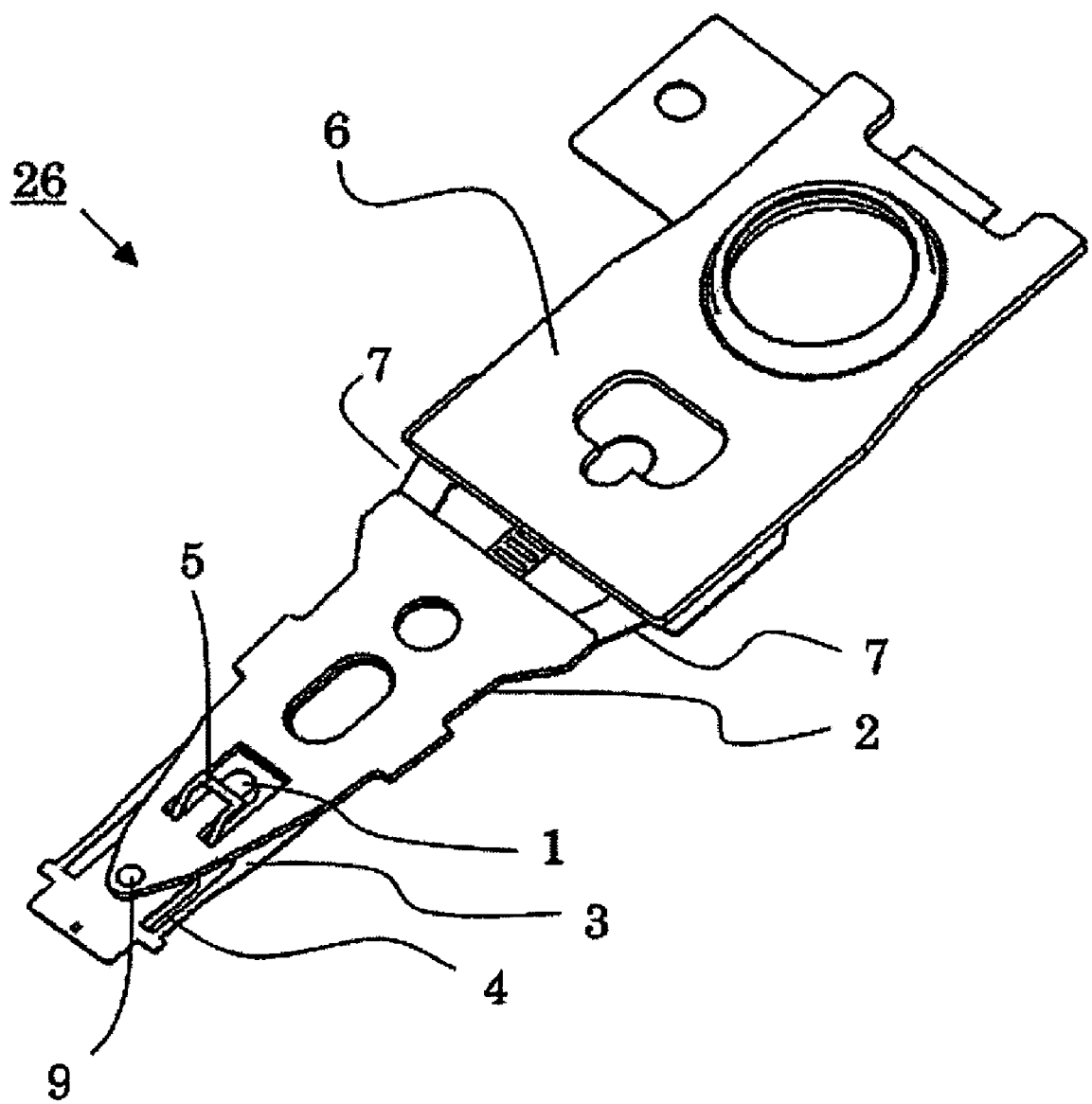
FIG. 1 is a perspective view showing a magnetic head assembly according to a first embodiment of the present invention.

FIG. 1 is a perspective view showing the magnetic head assembly 26 according to an embodiment of the present invention. A base plate 6 is attached to the actuator arm 25. A load beam 2 is welded to the base plate 6 via a hinge 7. A flexure 3 is welded to the load beam 2. A magnetic head slider 4 is mounted to the flexure 3. When the hinge 7 is bent, a load is applied to the magnetic head slider 4, in a magnetic disk direction, by way of the load beam 2 and a dimple 9 formed on a leading end of the load beam 2. An assembly including the hinge 7, the load beam 2, and the flexure 3 forms the suspension.

A limiter 5 formed by part of the flexure 3 is disposed so as to provide a clearance from a lift tab 1 formed by part of the load beam 2. A limiter clearance, if the clearance between the limiter 5 and the lift tab 1 just mentioned is so called for convenience sake, must be maintained as a physical clearance when the magnetic head slider 4 is in an ordinary flying state. When there is no clearance and there is a contact, gimbal stiffness of the flexure 3 becomes high. This makes the magnetic head slider 4 unable to fly properly. The limiter clearance must also be maintained in the ordinary flying state even with variations of many different types in parts making up the magnetic disk drive.

Figure 2:
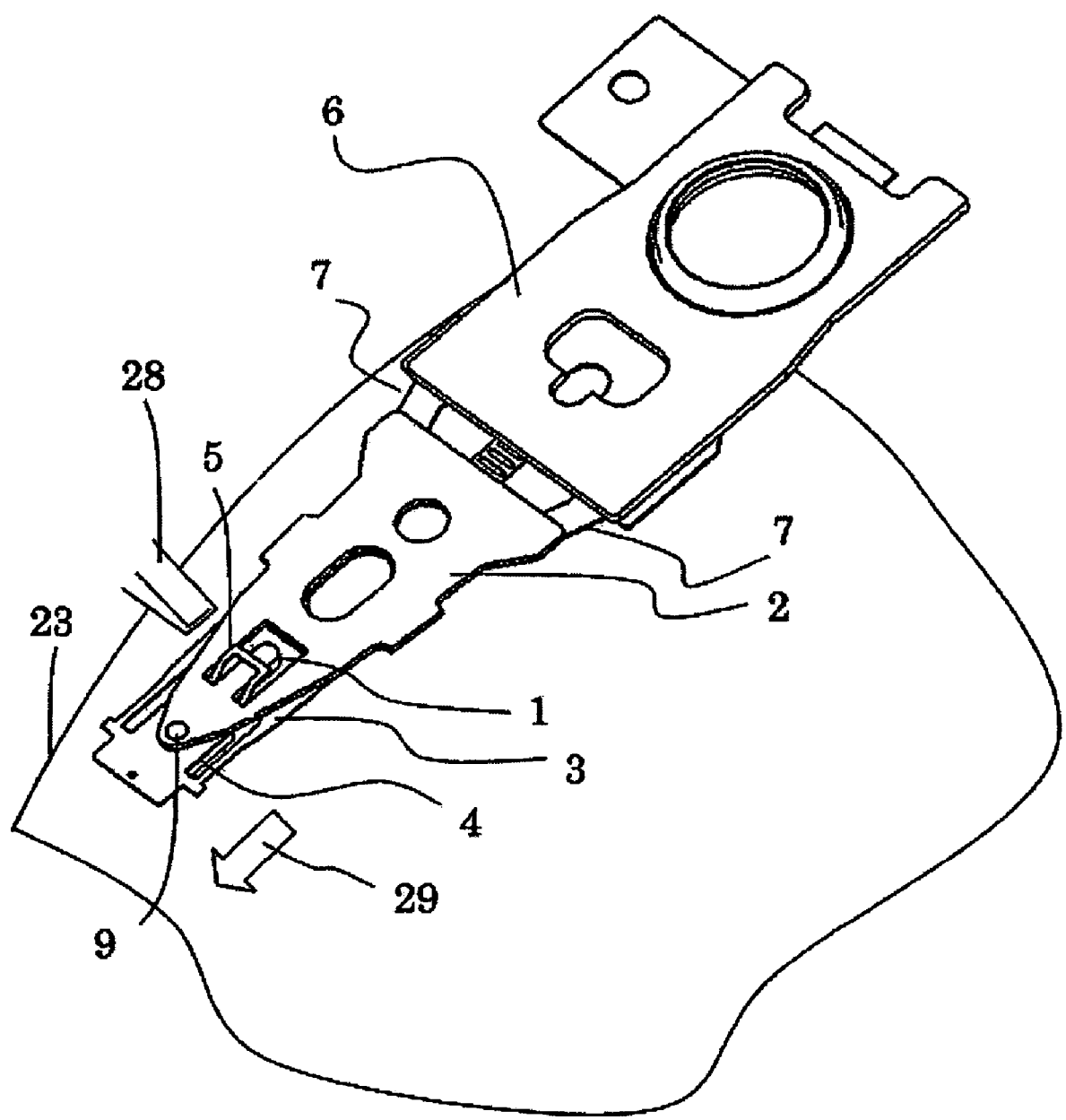
FIG. 2 is a perspective view showing positional relations among a magnetic head assembly, a magnetic disk, and a ramp mechanism according to the first embodiment of the present invention.

FIG. 2 is a view showing positional relations among the magnetic head assembly 26, the magnetic disk 23, and the ramp mechanism 28. The magnetic disk 23 rotates generally in a direction 29 from a side of the base plate 6 of the magnetic head assembly 26 toward the magnetic head slider 4. The lift tab 1 and the limiter 5 are disposed on a side of an air inflow end of the magnetic head slider 4. The ramp mechanism 28 is disposed so as to be engaged with the lift tab 1.

Figure 3A:
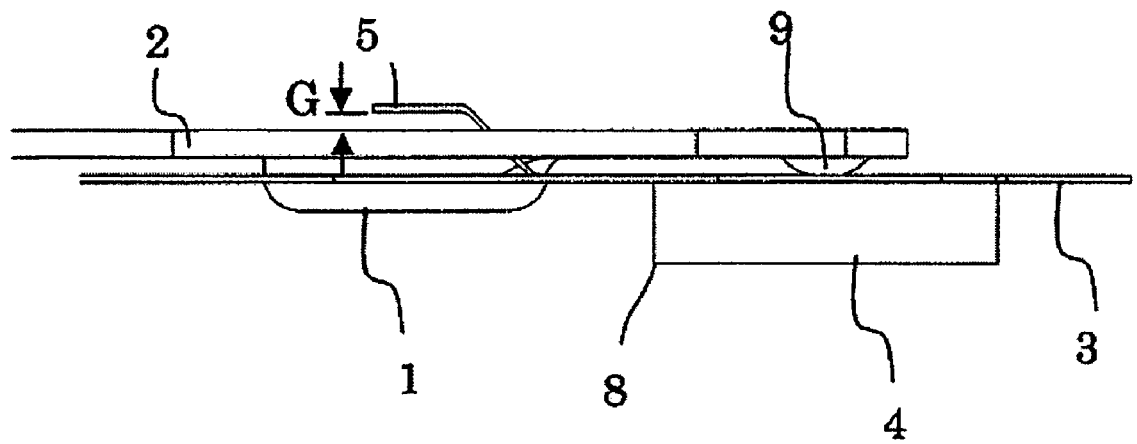
FIG. 3A is a side elevational view showing a magnetic head assembly in a flying state according to the first embodiment of the present invention.
Figure 3B:
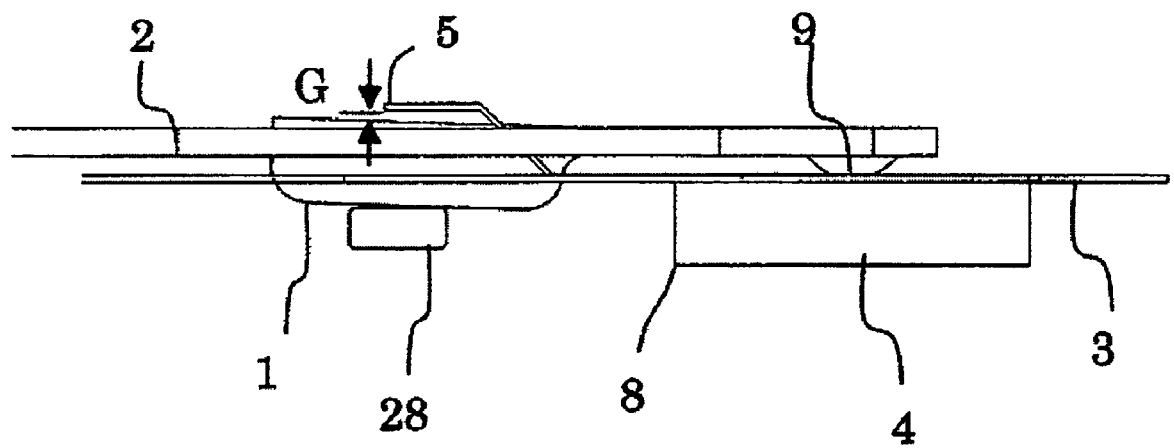
FIG. 3B is a side elevational view showing a magnetic head assembly in an unloaded position according to the first embodiment of the present invention.

FIG. 3A is a side elevational view showing the magnetic head assembly 26 with the magnetic head slider 4 in the flying state. FIG. 3B is a side elevational view showing the magnetic head assembly 26 in the unloaded position. In the condition depicted in FIG. 3A, in which the magnetic head slider 4 is in the flying state, an ample amount of a limiter clearance G is maintained even with variations of many different types in parts making up the magnetic disk drive, including variations in conditions of these parts in an assembly state. In FIG. 3B showing that the magnetic head assembly 26 is in the unloaded position, the lift tab 1 rides over the ramp mechanism 28. The lift tab 1 is then elastically deformed to make the limiter clearance G smaller. In the unloaded condition, an initial pitch attitude angle is assigned to the magnetic head slider 4. The pitch attitude angle is, in many cases, set on a slightly plus side. FIG. 3B shows that the pitch attitude angle is zero, that is, the magnetic head slider 4 runs parallel with the magnetic disk 23.

The magnetic head slider 4 rotates through a predetermined angle about the dimple 9 formed on the leading end of the load beam 2. If the magnetic head slider 4 rotates in a direction of making the pitch attitude angle negative, that is, in a direction in which an air inflow end 8 of the magnetic head slider 4 approaches the disk, the limiter clearance G is narrowed. This results in a contact at this localized point, thus restricting rotation. It is therefore possible to limit the absolute value of the negative pitch attitude angle to a predetermined value or less. Therefore, this eliminates the condition, in which the magnetic head slider 4 is loaded onto the magnetic disk 23 from the side of the air inflow end 8. This enhances reliability. When a magnetic head slider producing a large negative pressure is unloaded, the flexure 3 can at times leave the dimple 9. Even if this happens, the limiter clearance G is decreased due to the elastic deformation of the lift tab 1, which makes unloading easy and thus enhancing reliability during unloading.

Figure 4:
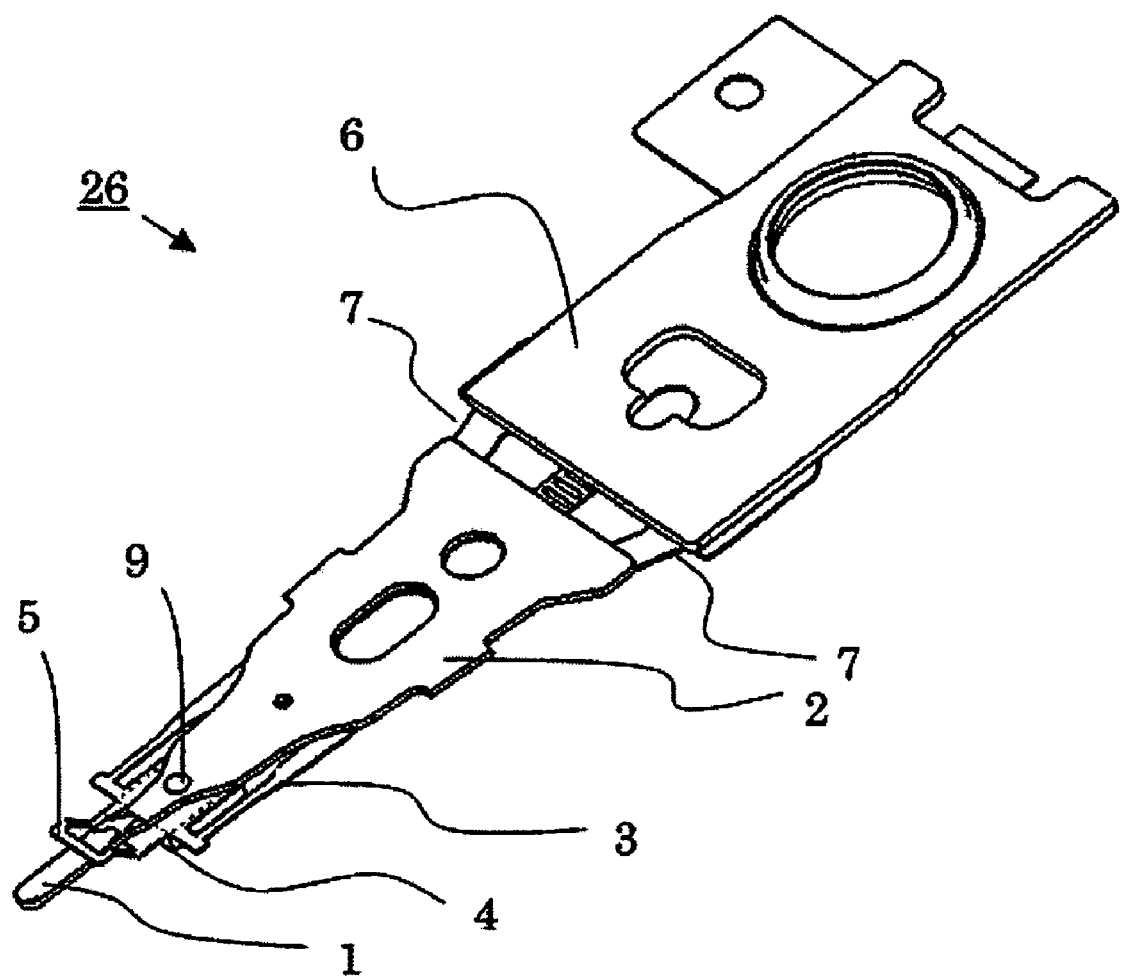
FIG. 4 is a perspective view showing a magnetic head assembly according to a second embodiment of the present invention.
Figure 5:
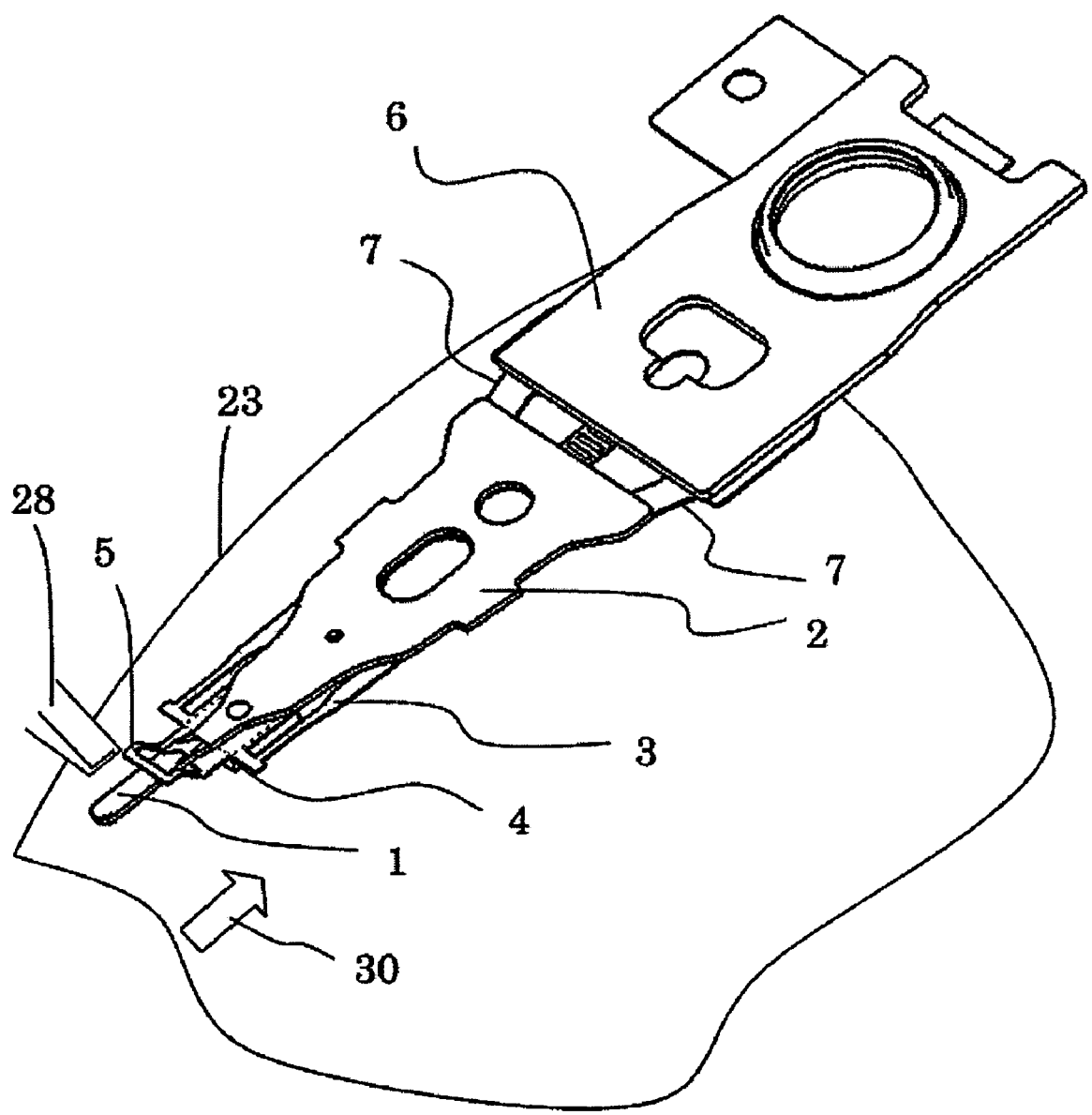
FIG. 5 is a perspective view showing positional relations among a magnetic head assembly, a magnetic disk, and a ramp mechanism according to the second embodiment of the present invention.

FIG. 4 is a view showing a magnetic head assembly according to another embodiment of the present invention. FIG. 5 is a view showing positional relations among a magnetic head assembly 26, a magnetic disk 23, and a ramp mechanism 28 according to this second embodiment of the present invention. Unlike the magnetic head assembly according to the first embodiment of the present invention, a lift tab 1 is formed at a leading end of a load beam 2. Further, a limiter 5 is formed on a leading end of a flexure 3 so as to be engaged with the lift tab 1. In a magnetic disk drive, to which the second embodiment of the present invention is applied, the magnetic disk 23 rotates in a direction in reverse of the direction in which the magnetic disk 23 used in the magnetic disk drive, to which the first embodiment of the present invention is applied, rotates. In the second embodiment of the present invention, too, therefore, the lift tab 1 and the limiter 5 are disposed on the side of an air inflow end of a magnetic head slider 4.

Figure 6A:
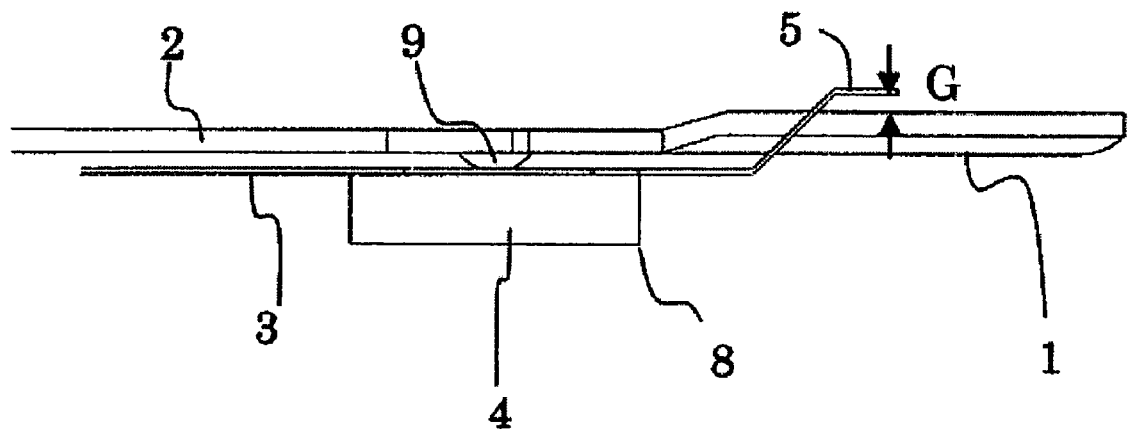
FIG. 6A is a side elevational view showing a magnetic head assembly in a flying state according to the second embodiment of the present invention.
Figure 6B:
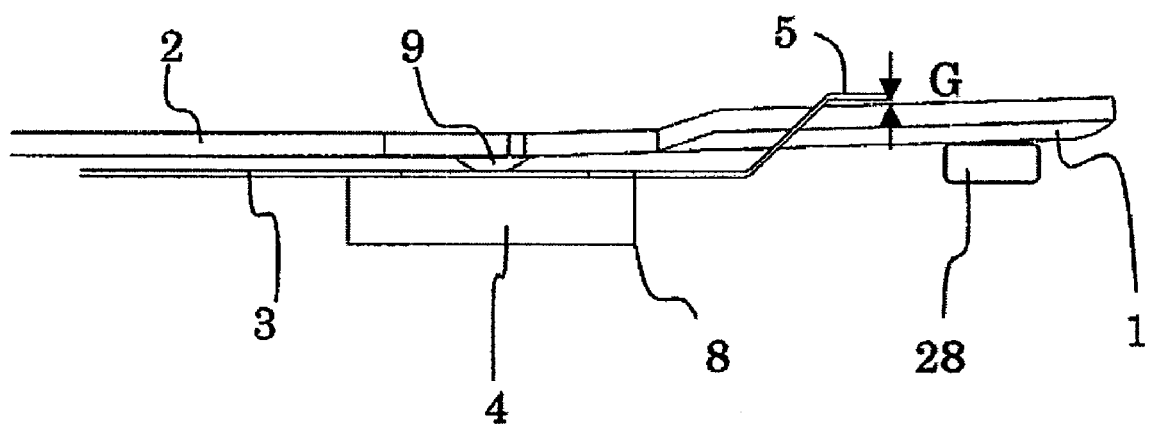
FIG. 6B is a side elevational view showing a magnetic head assembly in an unloaded position according to the second embodiment of the present invention.

6A is a side elevational view showing the magnetic head assembly with the magnetic head slider 4 in the flying state. FIG. 6B is a side elevational view showing the magnetic head assembly in the unloaded position. In the condition depicted in FIG. 6A, in which the magnetic head slider 4 is in the flying state, an ample amount of a limiter clearance G is sufficiently maintained even with variations of many different types in parts making up the magnetic disk drive, including variations in conditions of these parts in an assembly state. In FIG. 6B showing that the magnetic head assembly 26 is in the unloaded position, the lift tab 1 is engaged with a ramp mechanism 28. The lift tab 1 is then elastically deformed to make the limiter clearance G smaller. This limits a pitch attitude angle in a direction, in which an air inflow end 8 of the magnetic head slider 4 approaches a disk surface. This enhances reliability with which the magnetic head slider 4 is loaded onto the disk surface. When a magnetic head slider producing a large negative pressure is unloaded, the flexure 3 can at times leave the dimple 9. Even if this happens, the limiter clearance G is decreased due to the elastic deformation of the lift tab 1, which makes unloading easy and thus enhancing reliability during unloading.

Figure 7:
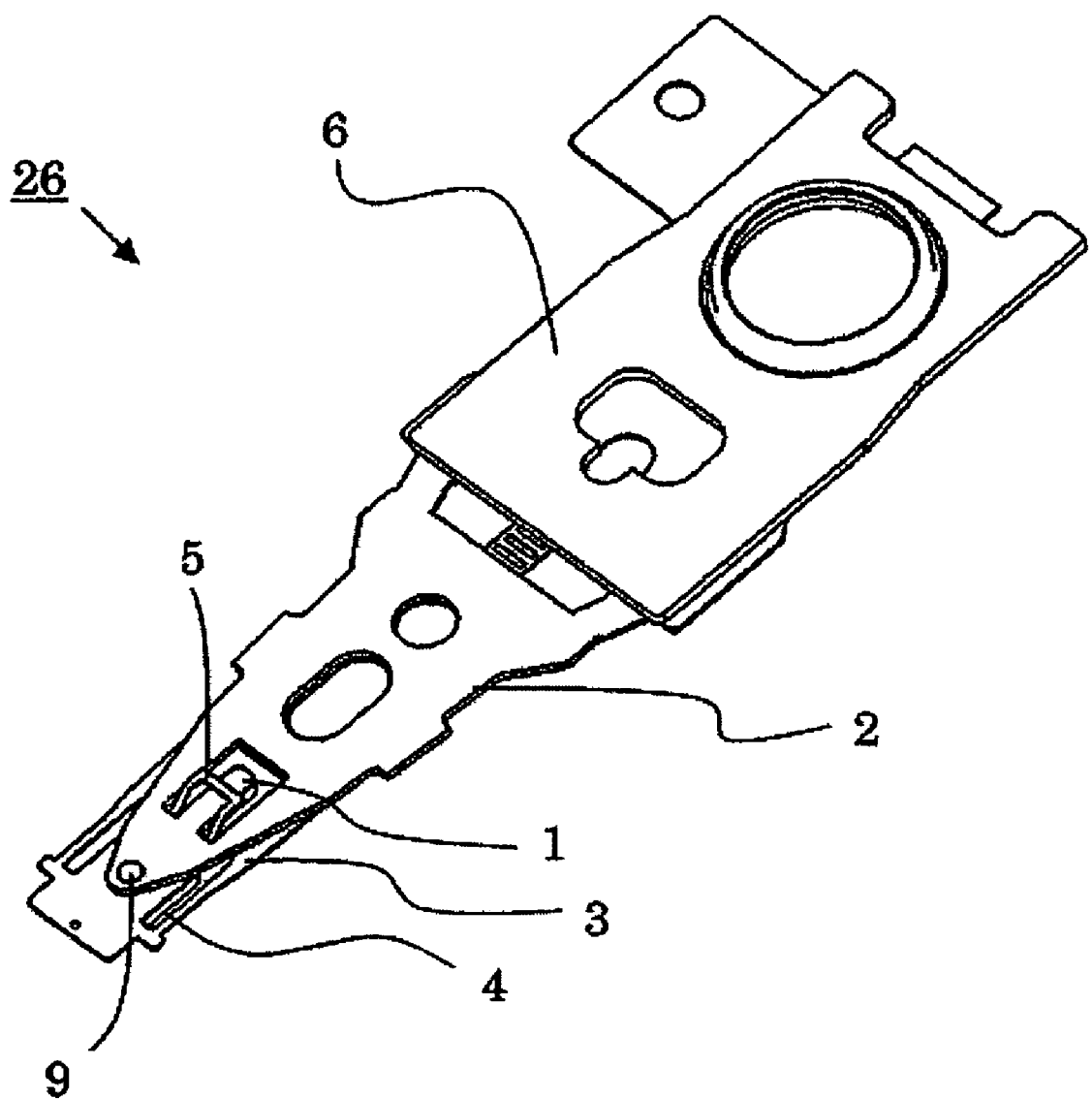
FIG. 7 is a perspective view showing a magnetic head assembly according to still another embodiment of the present invention.

In the aforementioned embodiments of the present invention, the suspension is formed as an assembly including the hinge 7, the load beam 2, and the flexure 3. It should, however, be noted that the invention is not limited to this arrangement only. Rather, the suspension may include a load beam 2 that is a load beam integrated with a hinge as shown in FIG. 7. In such a configuration, the portion near a joint between the load beam 2 and the base plate 6 forms a spring portion for generating load.

As described in the foregoing, according to each of the embodiments of the present invention, the absolute value of the pitch attitude angle can be limited to a predetermined value or less even if the pitch attitude angle of the magnetic head slider during loading is negative due to disturbances and vibration. This enhances reliability during loading. Further, since the limiter clearance is decreased due to the elastic deformation of the lift tab, unloading is easy and reliability during unloading is also enhanced.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A suspension supporting a magnetic head slider, the suspension, comprising:
   a load beam having a lift tab; and
   a flexure having one end attached to the load beam, a limiter engaged with the lift tab, and the other end including a portion for mounting a magnetic head slider, wherein the lift tab and the limiter are provided so as to be positioned on the side of an air inflow end of the magnetic head slider when the magnetic head slider is mounted to the portion of the flexure for mounting a magnetic head slider.

2. A suspension supporting a magnetic head slider, the suspension comprising:
   a load beam having a lift tab extending in a direction of an end portion attached to a base plate; and
   a flexure having one end attached to the load beam, a limiter engaged with the lift tab, and the other end including a portion for mounting a magnetic head slider.

3. The suspension according to claim 2,
   wherein the lift tab and the limiter are provided so as to be positioned on the side of an air inflow end of the magnetic head slider when the magnetic head slider is mounted to the portion of the flexure for mounting a magnetic head slider.

4. A suspension supporting a magnetic head slider, the suspension comprising:
   a load beam having a lift tab extending in a direction opposite to an end portion attached to a base plate; and
   a flexure having one end attached to the load beam and the other end including a portion for mounting a magnetic head slider and a limiter engaged with the lift tab, wherein the lift tab and the limiter are provided so as to be positioned on the side of an air inflow end of the magnetic head slider when the magnetic head slider is mounted to the portion of the flexure for mounting a magnetic head slider.

5. A suspension supporting a magnetic head slider, the suspension comprising:
   a load beam having one end, to which a hinge is attached, and the other end including a lift tab; and
   a flexure having one end attached to the load beam, a limiter engaged with the lift tab, and the other end including a portion for mounting a magnetic head slider, wherein the lift tab and the limiter are provided so as to be positioned on the side of an air inflow end of the magnetic head slider when the magnetic head slider is mounted to the portion of the flexure for mounting a magnetic head slider.

6. A suspension supporting a magnetic head slider, the suspension comprising:
   a load beam having one end, to which a hinge is attached, and the other end including a lift tab extending in a direction of the hinge; and
   a flexure having one end attached to the load beam, a limiter engaged with the lift tab, and the other end including a portion for mounting a magnetic head slider.

7. The suspension according to claim 6,
   wherein the lift tab and the limiter are provided so as to be positioned on the side of an air inflow end of the magnetic head slider when the magnetic head slider is mounted to the portion of the flexure for mounting a magnetic head slider.

8. A suspension supporting a magnetic head slider, the suspension comprising:
   a load beam having one end, to which a hinge is attached, and the other end including a lift tab extending in a direction opposite to the hinge; and
   a flexure having one end attached to the load beam and the other end including a portion for mounting a magnetic head slider and a limiter engaged with the lift tab, wherein the lift tab and the limiter are provided so as to be positioned on the side of an air inflow end of the magnetic head slider when the magnetic head slider is mounted to the portion of the flexure for mounting a magnetic head slider.

9. A magnetic head assembly, comprising:
   a base plate;
   a load beam having one end attached to the base plate and the other end including a lift tab;
   a flexure having one end attached to the load beam, a limiter engaged with the lift tab, and the other end including a portion for mounting a magnetic head slider; and
   a magnetic head slider mounted to the portion of the flexure for mounting a magnetic head slider, wherein the lift tab and the limiter are located on the side of an air inflow end of the magnetic head slider.

10. A magnetic head assembly, comprising:
    a base plate;
    a load beam having one end attached to the base plate and the other end including a lift tab extending in a direction of the base plate;

a flexure having one end attached to the load beam, a limiter engaged with the lift tab, and the other end including a portion for mounting a magnetic head slider; and a magnetic head slider mounted to the portion of the flexure for mounting a magnetic head slider.

11. The magnetic head assembly according to claim 10, wherein the lift tab and the limiter are located on the side of an air inflow end of the magnetic head slider.

12. A magnetic head assembly, comprising:

a base plate;

a load beam having one end attached to the base plate and the other end including a lift tab extending in a direction opposite to the base plate;

a flexure having one end attached to the load beam and the other end including a portion for mounting a magnetic head slider and a limiter engaged with the lift tab; and a magnetic head slider mounted to the portion of the flexure for mounting a magnetic head slider, wherein the lift tab and the limiter are located on the side of an air inflow end of the magnetic head slider.

13. A magnetic head assembly, comprising:

a base plate;

a load beam having one end attached to the base plate by way of a hinge and the other end including a lift tab;

a flexure having one end attached to the load beam, a limiter engaged with the lift tab, and the other end including a portion for mounting a magnetic head slider; and a magnetic head slider mounted to the portion of the flexure for mounting a magnetic head slider, wherein the lift tab and the limiter are located on the side of an air inflow end of the magnetic head slider.

14. A magnetic head assembly, comprising:

a base plate;

a load beam having one end attached to the base plate by way of a hinge and the other end including a lift tab extending in a direction of the base plate;

a flexure having one end attached to the load beam, a limiter engaged with the lift tab, and the other end including a portion for mounting a magnetic head slider; and a magnetic head slider mounted to the portion of the flexure for mounting a magnetic head slider.

15. The magnetic head assembly according to claim 14, wherein the lift tab and the limiter are located on the side of an air inflow end of the magnetic head slider.

16. A magnetic head assembly, comprising:

a base plate;

a load beam having one end attached to the base plate by way of a hinge and the other end including a lift tab extending in a direction opposite to the base plate;

a flexure having one end attached to the load beam and the other end including a portion for mounting a magnetic head slider and a limiter engaged with the lift tab; and a magnetic head slider mounted to the portion of the flexure for mounting a magnetic head slider, wherein the lift tab and the limiter are located on the side of an air inflow end of the magnetic head slider.

17. A magnetic disk drive, comprising:

a magnetic disk;

a magnetic head slider to read data from and writing data onto the magnetic disk; and a suspension to hold the magnetic head slider, the suspension comprising:

a load beam including a lift tab; and a flexure having one end attached to the load beam, a limiter engaged with the lift tab, and the other end including a portion for mounting the magnetic head slider, wherein the lift tab and the limiter are located on the side of an air inflow end of the magnetic head slider.

18. A magnetic disk drive, comprising:

a magnetic disk;

a magnetic head slider to read data from and writing data onto the magnetic disk; and a suspension to hold the magnetic head slider, the suspension comprising:

a load beam having one end attached to a hinge and the other end including a lift tab; and a flexure having one end attached to the load beam, a limiter engaged with the lift tab, and the other end including a portion for mounting the magnetic head slider, wherein the lift tab and the limiter are located on the side of an air inflow end of the magnetic head slider.

* * * * *